United States Patent [19]

Maier et al.

[11] Patent Number: 4,770,439
[45] Date of Patent: Sep. 13, 1988

[54] IMPACT PROTECTION SYSTEM FOR THE OCCUPANT OF A MOTOR VEHICLE

[75] Inventors: Walter Maier, Tiefenbronn; Rainer Kneip, Ditzingen; Friedrich Stephan, Hemmingen; Franz-Rudolf Wierschem, Weissach, all of Fed. Rep. of Germany

[73] Assignee: Dr. Ing. h.c.F. Porsche Aktiengesellschaft, Weissach, Fed. Rep. of Germany

[21] Appl. No.: 17,170

[22] Filed: Feb. 20, 1987

[30] Foreign Application Priority Data

Feb. 21, 1986 [DE] Fed. Rep. of Germany ....... 3605623

[51] Int. Cl.[4] .............................................. B60R 21/16
[52] U.S. Cl. ................................................... 280/732
[58] Field of Search ........................ 280/728, 732, 731

[56] References Cited

U.S. PATENT DOCUMENTS

| 3,708,179 | 1/1973 | Hulten | 280/732 |
| 3,794,349 | 2/1974 | Fuller | 280/732 |
| 3,801,126 | 4/1974 | Knight, IV et al. | 280/732 |
| 3,904,222 | 9/1975 | Bursott et al. | 280/732 |
| 3,966,227 | 6/1976 | Cameron | 280/752 |

FOREIGN PATENT DOCUMENTS

| 2320272 | 11/1973 | Fed. Rep. of Germany . | |
| 2324571 | 11/1973 | Fed. Rep. of Germany . | |
| 2425659 | 12/1975 | Fed. Rep. of Germany | 280/732 |
| 2848547 | 5/1980 | Fed. Rep. of Germany . | |
| 3011463 | 10/1981 | Fed. Rep. of Germany . | |

*Primary Examiner*—Kenneth R. Rice
*Attorney, Agent, or Firm*—Barnes & Thornburg

[57] ABSTRACT

An impact protection system for an occupant of a motor vehicle with a prefabricated constructional unit that is fastened at parts of the vehicle body and which includes a generator housing, a base plate, a gas cushion, a generator and a cover provided with a tearing seam, is provided with a receiving frame that is adjustably connected with a support part of a dashboard. The prefabricated constructional unit is fastened at the receiving frame. The support partg delimits a recess of the dashboard that is closed off by a recess cover. The cover, via a releasable snap-in connection and an additional fastening, interacts with the receiving frame such that when the gas cushion unfolds, the snap-in connection opens up and the cover, via a desired bending point formed by the receiving frame, is swivelled preferably upward in the direction of a windshield.

9 Claims, 7 Drawing Sheets

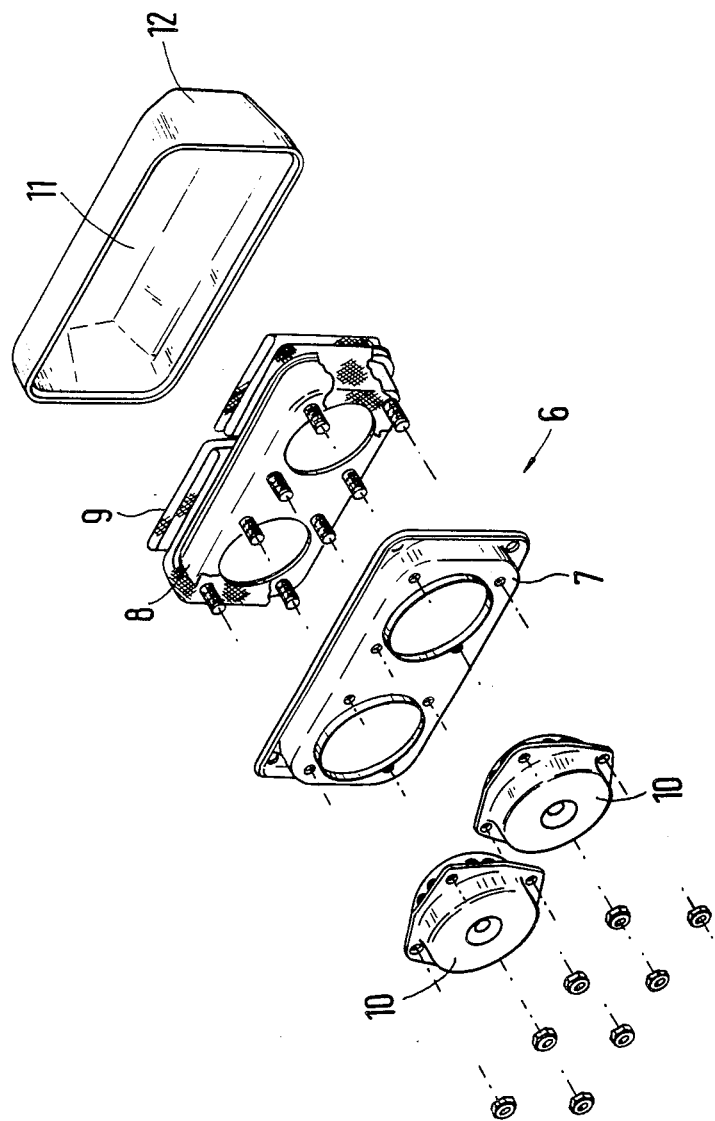

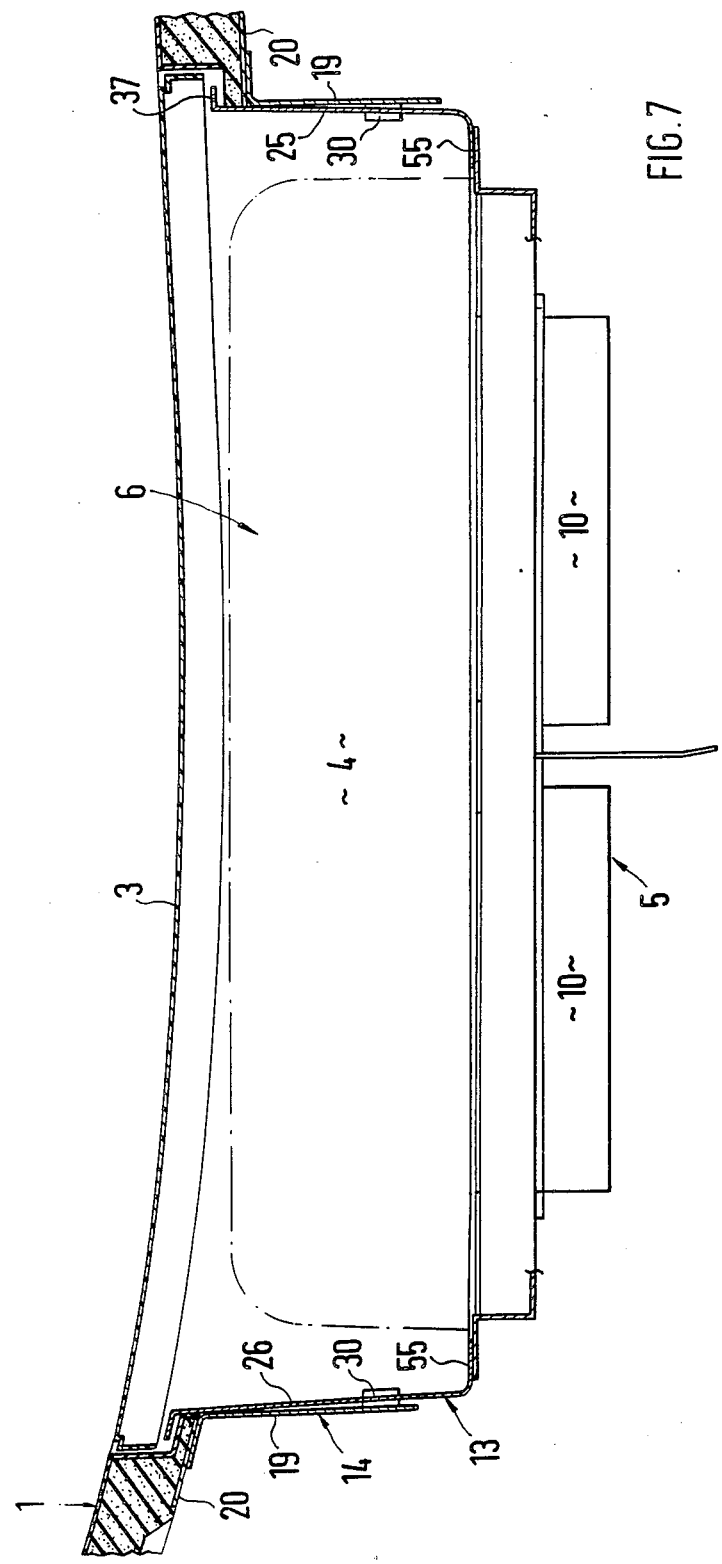

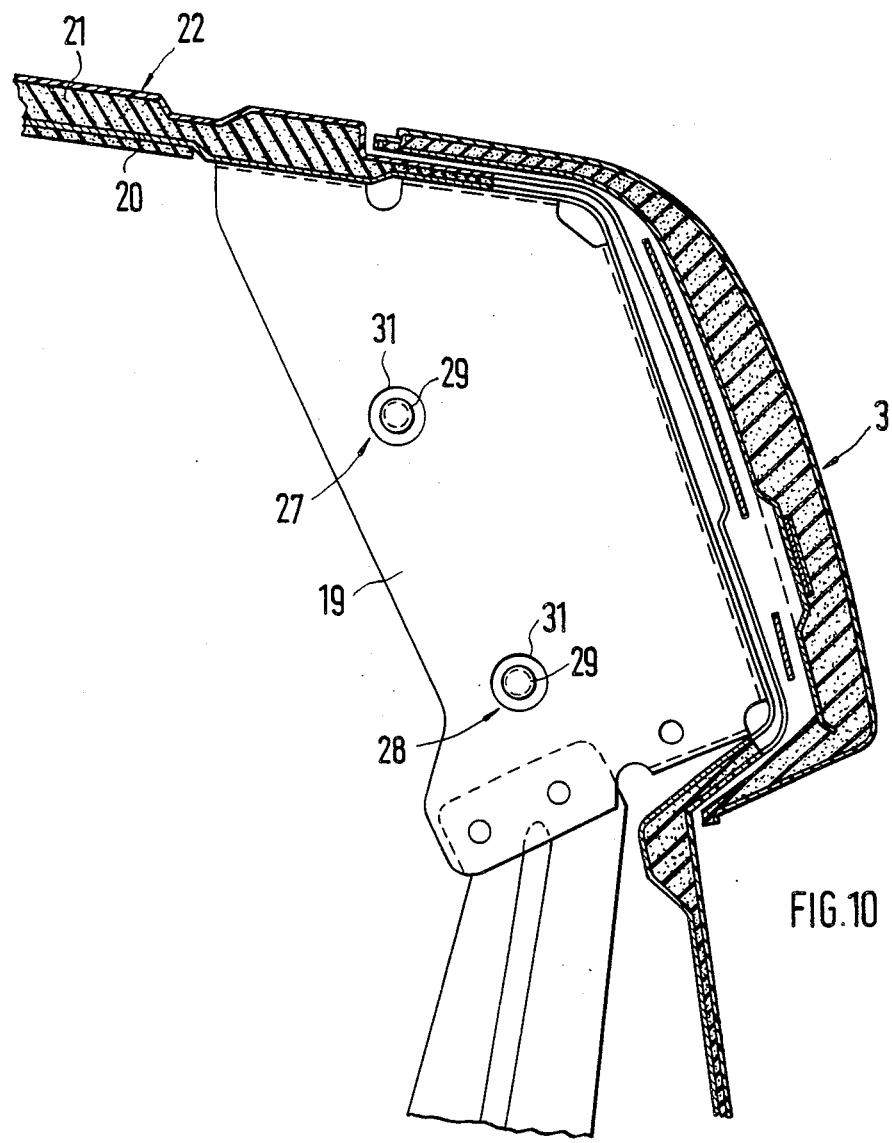

IMPACT PROTECTION SYSTEM FOR THE OCCUPANT OF A MOTOR VEHICLE

BACKGROUND AND SUMMARY OF THE INVENTION

The present invention relates to an impact protection system for an occupant of a motor vehicle having a prefabricated constructional unit that is attached to the vehicle. The constructional unit includes a generator housing, a base plate, a gas cushion, at least one generator and a cover that is provided with a tearing seam.

In a known impact protection system of the abovementioned type described in German Published Unexamined Patent Application No. 3,011,463, a generator housing, a base plate, a gas cushion, a generator and a covering that is provided with a tearing seam are formed into an operative prefabricated constructional unit that is fastened at the interior walls of the vehicle. Information on the retaining arrangement of this constructional unit in the vehicle or on the type of fastening is not contained in this patent text.

German Published Unexamined Patent Application No. 2,425,659 describes an impact protection system for the occupant of a motor vehicle that is inserted into a recess of a dashboard. The opening of the recess that faces the passenger compartment can be closed by a cover that is composed of two flaps. The flaps, at the upper and the lower edges of the opening, via horizontally extending hinge shafts, are pivotably connected with the dashboard. The two flaps are held in their closed position by means of synthetic threads that, on one side, are fastened at the lower flap and, on the other side, are fastened at the gas generator. The gas generator and the air bag are inserted into a housing with a U-shaped profile that is developed so that it is open in the direction of the occupant and with an upright web rests against a wall of the body.

The above impact protection device has the disadvantage that its assembly results in additional expenditures because the individual constructional components are not combined into a prefabricated constructional unit. The housing must be connected with the wall of the body; the two flaps must be connected with the dashboard; and the gas generator as well as the gas cushion must be connected with the housing before finally, the synthetic threads are attached for the holding of the flaps.

Another disadvantage of this arrangement consists of the fact that when the gas cushion unfolds, a flap is swivelled in downward direction, which may result in injuries to the occupant's knee. In addition, this impact protection system will only operate perfectly if the upper limiting wall of the cover and the hinge shaft have a straight shape. However, if the upper limiting edge of the cover—seen in top view—is curved, which as a rule is true for instrument panels, this type of hinge is useless.

It is an objective of the present invention to provide an impact protection system that avoids injury to the occupant, can be mounted at the body in a simple and rapid way, and by means of the given shape of the upper limiting edge, ensures a perfect functioning.

This and other objectives are achieved by the present invention by providing an impact protection system having a prefabricated constructional unit with a support part of a dashboard delimiting a recess of the dashboard. This recess is closed off by a recess cover. A receiving frame is adjustably connected with the support part, the prefabricated constructional unit being fastened to the receiving frame. A releasable snap-in connection and an additional fastening allows the recess cover to interact with the receiving frame such that when the gas cushion unfolds, the snap-in connection opens and the recess cover, via the desired bending point formed by the receiving frame, is swivelled substantially upwards in the direction of a windshield.

The main advantages that are achieved by means of the present invention are that due to the receiving frame, a fast, simple and tolerance-compensating mounting of the impact protection system is achieved. In addition, the fastening of the prefabrication constructional unit is significantly facilitated by the plug connection between the constructional unit and the receiving frame because the constructional unit no longer has to be held in position manually. Also, since the cover is swivelled in the direction of the windshield, injury to the occupant is avoided. In addition, due to the construction of the receiving frame and the cover, the latter always carries out a perfect swivelling motion when the gas cushion is inflated, irrespective of the shape of the cover's upper bordering edge.

Other objects, advantages and novel features of the present invention will become apparent from the following detailed description of the invention when considered in conjunction with the accompanying drawings.

BRIEF DESCRIPTION OF THE DRAWINGS

FIG. 3 is an exploded view of the individual components of a constructional unit;

FIG. 7 is a sectional view according to Line VII—VII of FIG. 5;

FIG. 10 is a view in the direction of the Arrow S of FIG. 9.

DETAILED DESCRIPTION OF THE DRAWINGS

Figure 1:
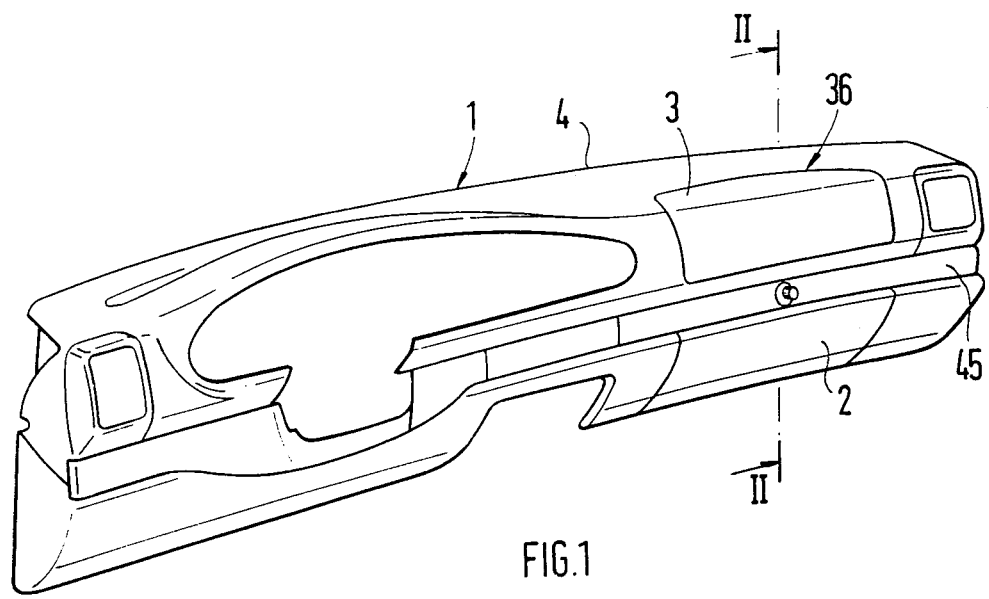
FIG. 1 is a perspective view from the direction of the passenger compartment of a dashboard having an impact protection system of the present invention for a passenger.
Figure 2:
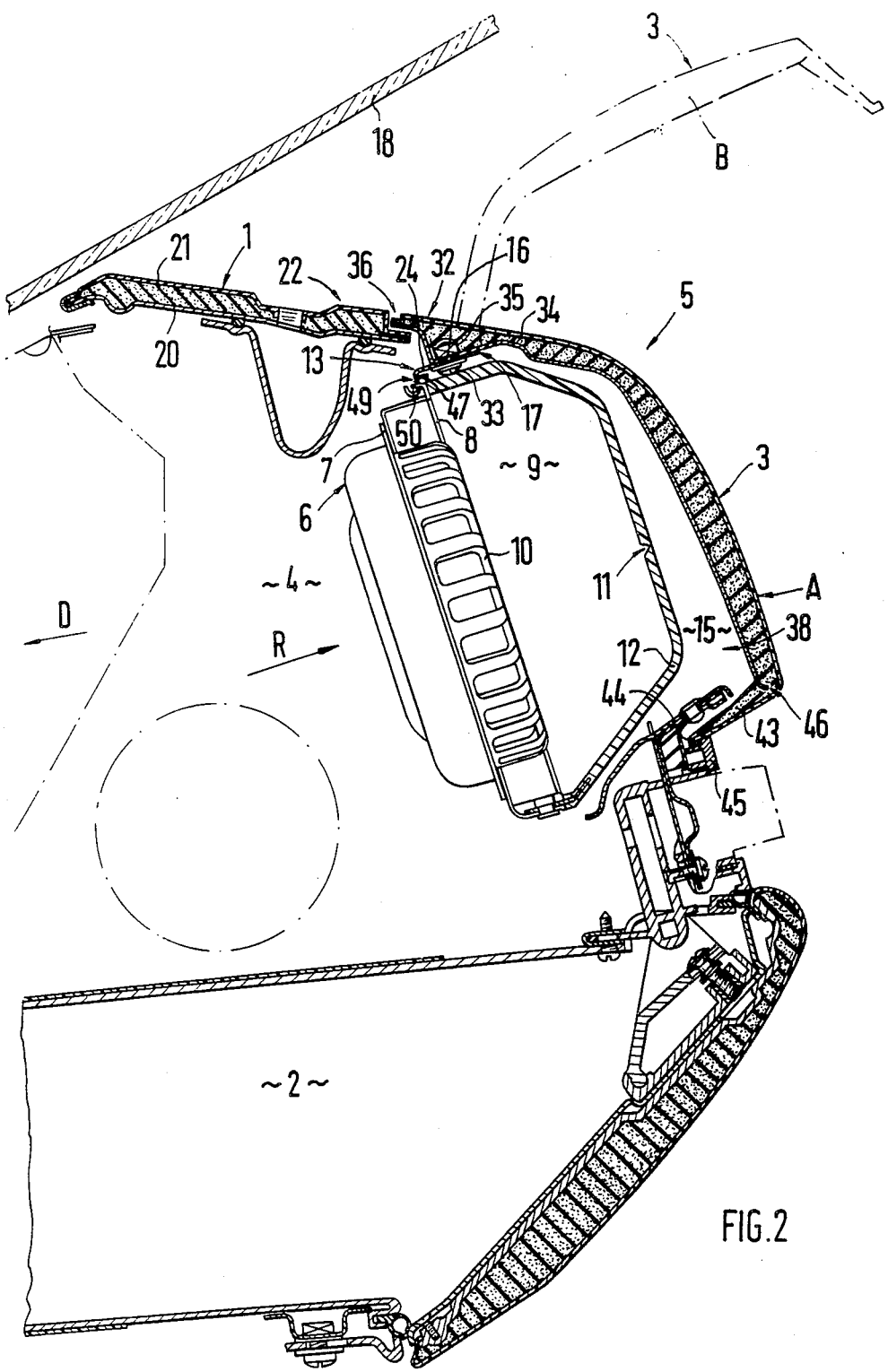
FIG. 2 is an enlarged sectional view according to Line II—II of FIG. 1.

The dashboard 1 that is shown in FIG. 1, on the front passenger side, above a glove compartment 2, has a recess 4 that is closed by a cover 3. As seen in FIG. 2, an impact protection system 5 (airbag) for an occupant of a motor vehicle is arranged in the recess 4. The impact protection system 5, outside the vehicle, is assembled into a prefabricated operative constructional unit 6 (as seen in FIG. 3) and comprises a generator housing 7, a base plate 8, an inflatable gas cushion 9, two generators 10, and a cover 12 provided with a tearing seam 11, as well as fastening elements that are not shown in detail.

A good functioning as well as a fast and simple mounting of the impact protection system 5 is achieved since the prefabricated constructional unit 6 is fastened at a receiving frame 13 that is inserted into the recess 4 of the dashboard 1. The receiving frame 13 is held in position at a support part 14 of the dashboard 1 delimiting the recess 4, such that it can be adjusted. In addition, the cover 3 closing off the recess 4, via a detachable snap-in connection 15 (FIG. 9) and an additional fastening 16 (FIG. 2), is connected with the receiving frame 13 in such a way that, when the gas cushion 9 is unfolded, the snap-in connection 15 opens up and the cover 3 is swivelled (as seen in FIG. 2) from a closed position A, via a desired bending point 17 formed by the receiving frame 13, upwards into open position B in the direction of a windshield 18.

As seen in FIG. 7, the support part 14 comprises two upright webs 19 that extend in longitudinal direction of the vehicle, are arranged separated from one another and are connected firmly with a reinforcing insert 20 of the dashboard 1 (for example, by means of welding). The reinforcing insert 20 extends over the whole width of the dashboard and in cross-sectional view, is adapted to the shape of the dashboard. According to FIG. 2, the reinforcing insert 20 that is made of aluminum or sheet steel in preferred embodiments, is arranged on the side of the dashboard 1 that faces away from the occupant, and is covered by a foam layer 21 and a decorative cover layer 22.

Figure 6:
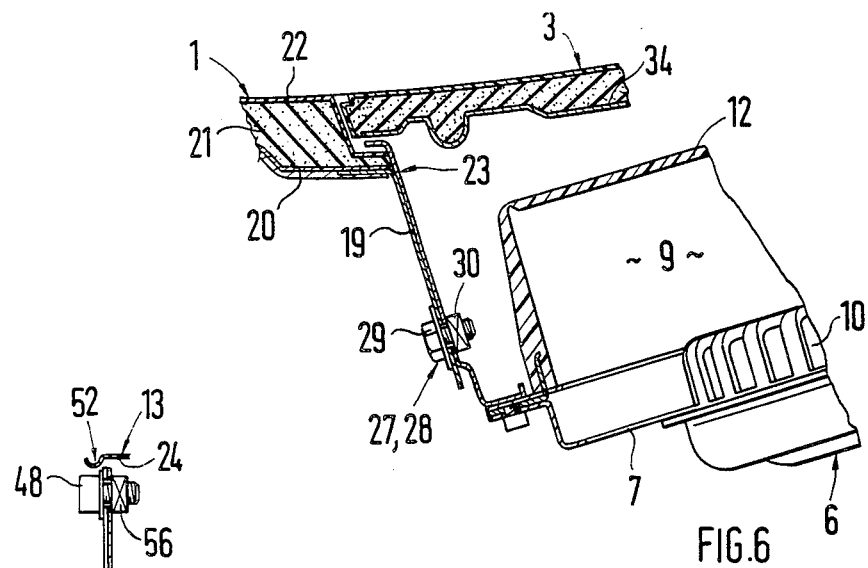
FIG. 6 is a sectional view according to Line VI—VI of FIG. 5.

In the area of the recess 4, the reinforcing insert 20 has a corresponding opening 23 through which the receiving frame 13 is inserted (FIG. 6).

Figure 5:
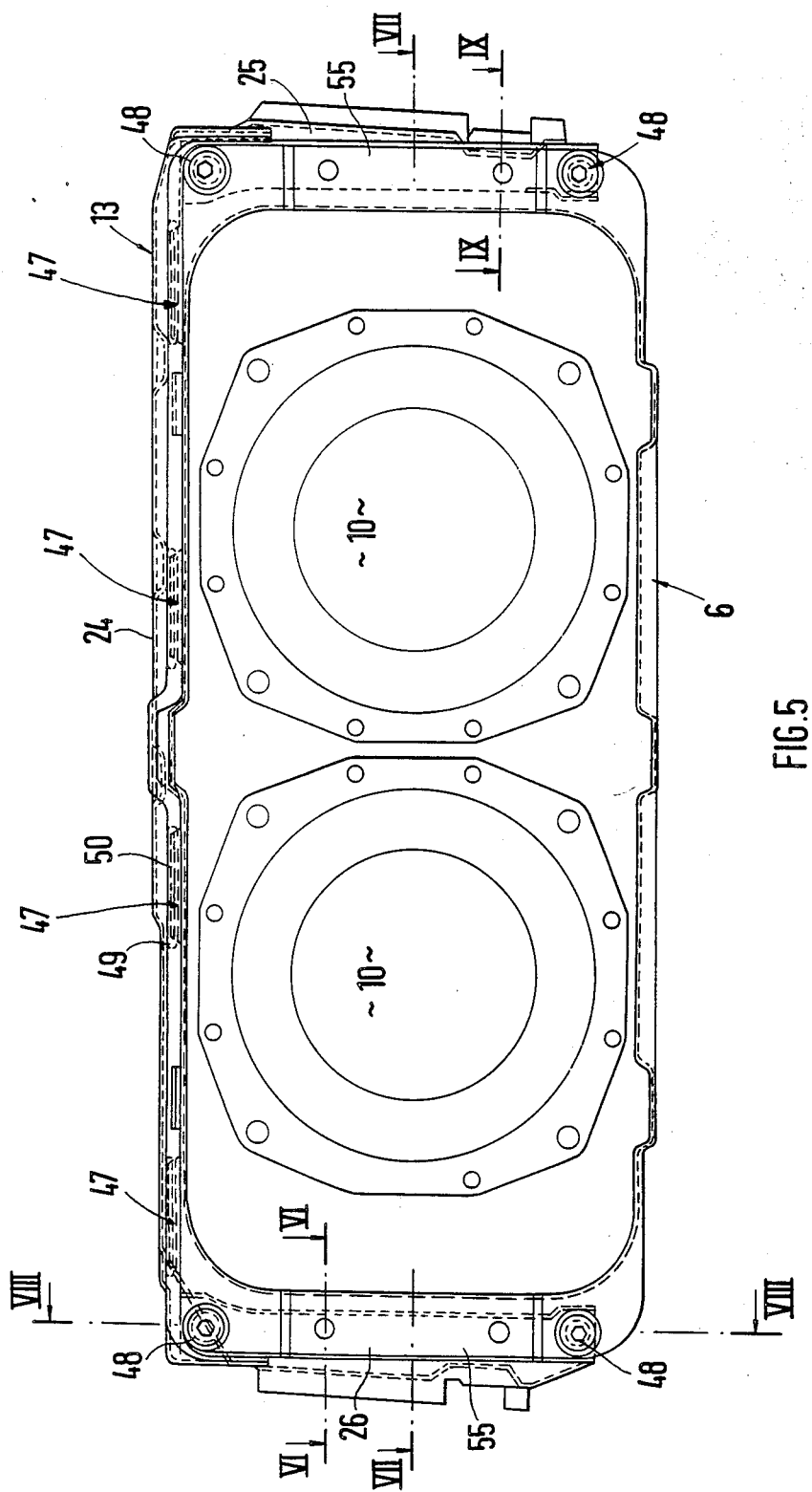
FIG. 5 is a view in the direction of the Arrow R of FIG. 2, in which only the receiving frame and the constructional unit are shown.

The receiving frame 13 that is formed of an upper transverse part 24 and two upright lateral parts 25, 26 (FIG. 5) is pushed into the recess 4 from the side of the dashboard 1 facing the occupant. On each longitudinal side, at 27 and 28, the receiving frame 13 is connected by fastening screw 29 with a web 19 of the support part 14 (FIGS. 6, 10). The fastening screws 29, from the exterior sides of the webs 19, are screwed into threaded nuts 30 of the receiving frame 13, in which case circular openings 31 are arranged at the webs 19, said openings 31 having a larger cross-section than the cross-section of the fastening screw 29. This results in an adjustability of the receiving frame 13 and of the cover 3 connected with the receiving frame 13 (FIG. 10).

As seen in FIG. 2, the cover 3, at its upper end area 32 that faces the windshield 18, is connected directly by screws 33 with the transverse part 24 of the receiving frame 13. An end-side section of a support sheet 34 of the cover 3, at least over a partial area of its transverse course, rests on the top side of the transverse part 24. From below, the screws 33 are screwed into threaded nuts 35 of the cover 3, also providing adjustability of the receiving frame 13 to cover 3.

Figure 4:
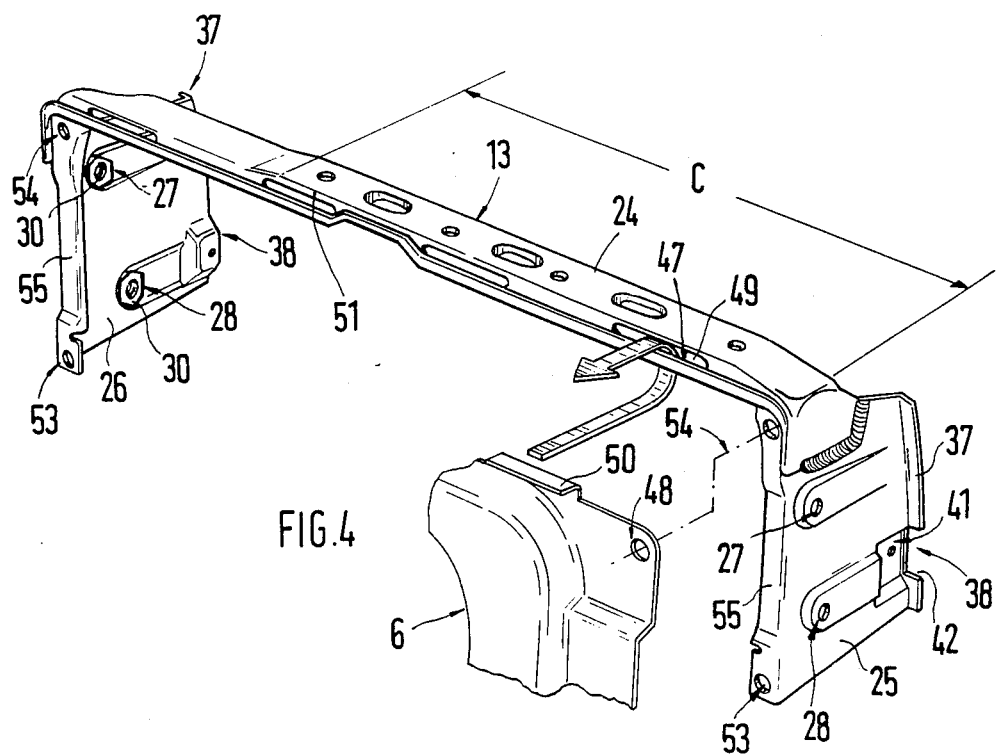
FIG. 4 is a diagonal perspective view of a receiving frame and a partial view of the constructional unit.

Since an upper limiting edge 36 of the cover 3 or a corresponding edge of the dashboard 1, seen in top view in FIG. 7, are bent considerably, the connection between the receiving frame 13 and the cover 3 is provided only in a partial area C of the width of the cover 3 as shown in FIG. 4.

As shown in FIG. 2, when the gas cushion 9 of the constructional unit 6 is inflated, the limiting edge of the transverse part 24 that is to the rear with respect to driving direction D forms the desired bending point 17 for the cover 3. Around this bending point 17, the cover 3 is swivelled in the direction of the windshield 18 into an open position B that is shown by a dash-dotted line. Adjacent to the desired bending point 17, the support sheet 34 of the cover 3 that is made preferably out of a thin-walled aluminum sheet, is flexible such that, in this zone, no reinforcing beads are necessary.

When viewed in longitudinal direction of the vehicle, the transverse part 24 has a smaller longitudinal course than the two lateral parts 25, 26 that are led to the support sheet 34 of the cover 3. The two lateral parts 25, 26 have flanges 37 that extend transversely at the end side (FIG. 4).

Figure 9:
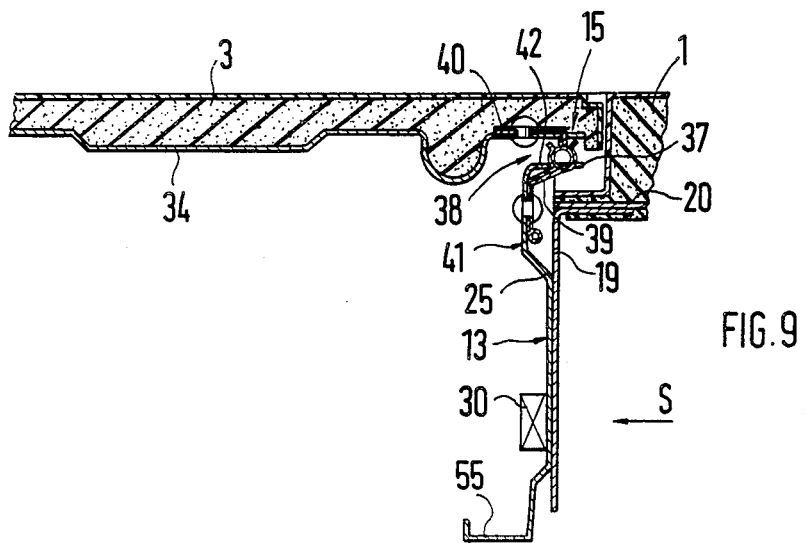
FIG. 9 is a sectional view according to Line IX—IX of FIG. 5.

The releasable snap-in connection 15 between the cover 3 and the receiving frame 13 is provided at 38, (FIG. 4), namely in each case outside the lateral parts 25, 26 of the receiving frame 13. Each snap-in connection 15 comprises a spring buckle 39 mounted at the receiving frame 13 and a cylindrical holding part 40 fastened at the support sheet 34, the spring buckle 39 in sections reaching around the holding part 40 (FIG. 9). The required holding force is determined empirically. The cylindrical holding part 40 is aligned approximately vertically and, by means of riveting, is held in position at the support sheet 34. The spring buckles 39 are mounted at the lateral parts 25, 26 of the receiving frame 13 and open in the direction of the holding part 40. In the area of the spring buckle 39, the receiving frame 13 has an indentation 41 and a free cut 42 (FIG. 4).

An end area 43 of the cover 3 that is furthest from the desired bending point 17, by means of an apron 44 pointing in downward direction, reaches around a switch panel 45 fastened at the dashboard 1 and is held in position by it. No support sheet 34 is provided in this end area 43; the support sheet 34 ends at 46 and there forms a buckling edge for the end area 43 when the cover 3 is opened.

Figure 8:
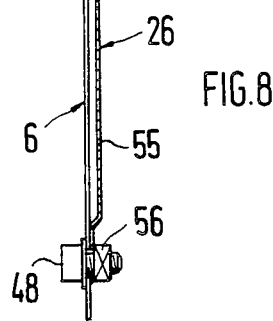
FIG. 8 is a sectional view according to Line VIII—VIII of FIG. 5.

The constructional unit 6 is pushed into the receiving frame 13 from the side of the dashboard 1 that faces away from the occupant and is held in position at said receiving frame 13 by a plug connection 47 and fastening screws 48 (FIGS. 4, 8). Before the mounting of the fastening screws 48, the plug connection 47 takes place first so that for the inserting of the fastening screws 48, the construction unit 6 is automatically held in position.

The plug connection 47 is formed by at least one slot opening 49 arranged in the transverse part 24 of the receiving frame 13, into which a bent-back tongue 50 of the constructional unit 6 is inserted. According to FIG. 5, several slot openings 49 and tongues 50 are provided respectively at the receiving frame 13 and the constructional unit 6.

The slot openings 49 are provided at the end of the transverse part 24 that is located in front in driving direction D, namely at an upright web 51 of a reinforcing bead 52 that has an approximately U-shaped profile (FIGS. 4 and 8).

At points 53 and 54, the constructional unit 6 rests directly against a transversely extending flange 55 of the receiving frame 13 (FIGS. 4, 8) and is held in position by means of fastening elements 48 aligned in longitudinal direction of the vehicle. These elements 48 are screwed into threaded nuts 56 that are mounted in one piece with the receiving frame 13.

The mounting of the impact protection system 5 takes place as indicated below: First, the cover 3 is screwed together with the receiving frame 13 and the snap-in connection 15 is established. Subsequently, the receiving frame 13, together with the cover 3, is pushed into the support part 14. The receiving frame 13 is fastened at the support part 14 such that a stylistically perfect course of the joint exists between the cover 3 and the adjacent dashboard 1. Finally, the pre-assembled constructional unit 6 is inserted into the receiving frame 13 from the rear and is connected by the plug connection 47, after which the fasteninq screws 48 are screwed in.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An impact protection system for a motor vehicle occupant, comprising:
   a receiving frame connected to fixed vehicle structure at a vehicle dashboard recess,
   a prefabricated gas cushion unit including gas generator housing means, gas generator means supported in the gas generator housing means, inflatable gas cushion means and gas cushion release cover means operable to open in response to inflation of the gas cushion means by the gas generator means;
   dashboard recess cover means closing the dashboard recess such that said recess cover means opens in response to inflation of the gas cushion means to accommodate expansion thereof into a vehicle passenger space, and
   gas cushion unit fastening means for fastening the gas cushion unit, as a unit, to fastening means including interengageable plug connection means at the gas cushion unit and the receiving frame for positioning the gas cushion unit during assembly.

2. An impact protection system according to claim 1, wherein the gas cushion unit fastening means includes fastening screw means disposed on a side of the gas cushion unit spaced from the plug connection means.

3. An impact protection system according to claim 1, wherein the plug connection means is formed by at least one slot opening in the receiving frame through which a bent-back tongue of the gas cushion unit is guided.

4. An impact protection system according to claim 3, wherein the receiving frame has a transverse part with a U-shaped profile and the slot opening is in the area of a reinforcing bead of the tranverse part.

5. An impact protection system according to claim 1, wherein the receiving frame has an upper transverse part and two exterior lateral parts.

6. An impact protection system according to claim 5 wherein said traverse part has a delimiting edge located in the rear with respect to the driving vehicle driving direction forming a desired bending point, said recess cover means having a support sheet connected directly with the transverse part over at least, a partial area of the traverse course of said traverse part.

7. An impact protection system according to claim 6, wherein said recess cover means has a carrier sheet with an unreinforced, flexible zone adjacent said desired bending point.

8. An impact protection system according to claim 1, wherein the recess cover means is connected by a releasable snap-in connection which includes a spring buckle arranged at the receiving frame and a cylindrical holding part mounted at a support sheet of the recess cover means, and wherein the spring buckle reaches around the holding part in section.

9. An impact protection system according to claim 5, further including an apron at a side of the recess cover means facing away from said bending point and pointing downward and reaching behind a switch panel fastened at the dashboard.

* * * * *